(12) United States Patent
Kelm

(10) Patent No.: US 6,851,669 B2
(45) Date of Patent: Feb. 8, 2005

(54) DRAWING-DEVICE MECHANISM FOR A MACHINE FOR PROCESSING SHEET-LIKE PRINTING MATERIALS

(75) Inventor: Carsten Kelm, Ketsch (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 114 days.

(21) Appl. No.: 10/112,293

(22) Filed: Mar. 28, 2002

(65) Prior Publication Data

US 2002/0153122 A1 Oct. 24, 2002

(30) Foreign Application Priority Data

Mar. 28, 2001 (DE) .......................................... 101 15 317

(51) Int. Cl.[7] .............................................. B65G 3/04
(52) U.S. Cl. ....................................................... 271/34
(58) Field of Search ............................ 271/34; 474/136

(56) References Cited

U.S. PATENT DOCUMENTS 1,570,591 A * 1/1926 Mercer ........................ 474/115
5,511,475 A    4/1996 Pfizenmaier
5,649,483 A    7/1997 Mack et al.

FOREIGN PATENT DOCUMENTS

| DE | 44 23 286 C2 | 1/1996 |
| DE | 195 19 374 C2 | 11/1996 |
| DE | 199 36 096 C1 | 10/2000 |

* cited by examiner

Primary Examiner—Richard Ridley
(74) Attorney, Agent, or Firm—Laurence A. Greenberg; Werner H. Stemer; Gregory L. Mayback

(57) ABSTRACT

A drawing-device mechanism includes an endless drawing device and two wheels, around which the drawing device is partially looped. One wheel has a locally fixed axis of rotation and the other wheel is adjustable within an adjustment range. A drawing-device tensioner produces pretensioning. During an adjustment of the second wheel, with an increase in the center-to-center distance in a first case and with a reduction in the center-to-center distance in a second case, the drawing-device pretensioning remains approximately unchanged as a result of a reduction in the looping of the drawing device around the drawing-device tensioner in the first case and an increase in the looping of the drawing device around the drawing-device tensioner in the second case, absent any change in location of the drawing-device tensioner. A machine such as a sheet-processing rotary printing machine has the drawing-device mechanism.

7 Claims, 6 Drawing Sheets

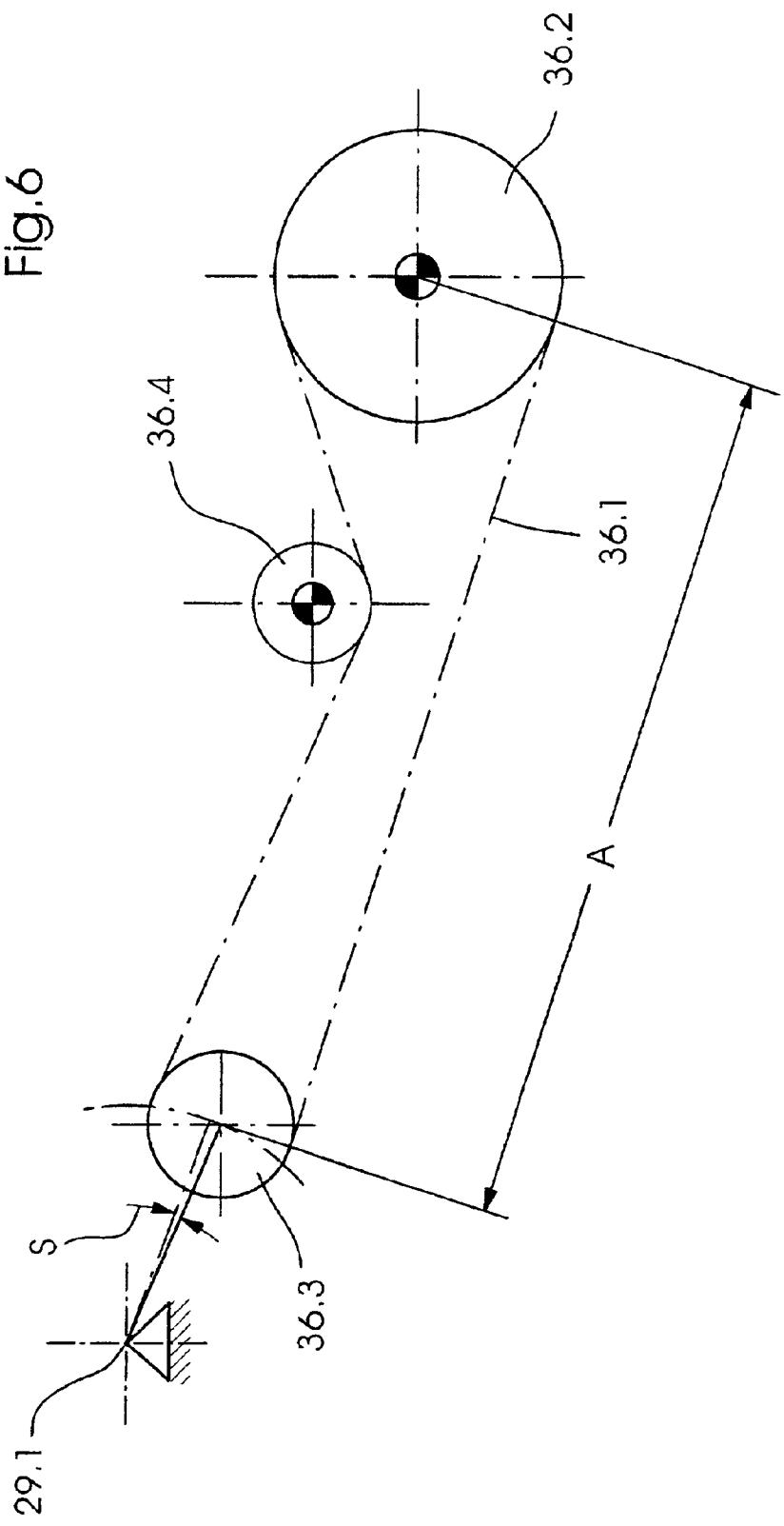

DRAWING-DEVICE MECHANISM FOR A MACHINE FOR PROCESSING SHEET-LIKE PRINTING MATERIALS

BACKGROUND OF THE INVENTION

Field of the Invention

The invention relates to a drawing-device mechanism for a machine which processes sheet-like printing materials, in particular a sheet-processing rotary printing machine, having an endless drawing device, a first and a second wheel, and a drawing-device tensioner in an arrangement wherein the drawing device is partially looped or wrapped around the first and the second wheel, the drawing-device tensioner, with the drawing device partially looped or wrapped around it, the drawing device being tautened in the process by pretensioning thereof, is engaged with or positioned against the drawing device, the first wheel has a locally stationary axis of rotation, and the second wheel, with a varying center-to-center distance between it and the first wheel, and with elongated sections of the drawing device being maintained, is adjustable to different positions within an adjustment range, and also having a tensioning surface which is formed on the drawing-device tensioner, is directed towards the drawing device and is curved convexly in the longitudinal direction of the drawing device.

A drawing-device mechanism of the type mentioned in the introduction hereto has become known heretofore, for example, from the published German Patent Document DE 44 23 286 C2, to be precise from the exemplary embodiment according to FIG. 2 of this heretofore published document. As disclosed therein, the wheel which can be adjusted to different positions serves for driving an additional roller of an offset printing unit, it being possible for the roller to be adjusted between two operating positions. This additional roller, in one of the positions thereof, is engaged with or positioned against an ink-unit roller and, in another position, is engaged with or positioned against a plate cylinder, and rotates at a constant speed in the two positions. Moreover, in each of the aforementioned positions of the additional roller, the drawing device which drives the additional roller is subjected to constant tensioning, respectively, during operation, with the result that, as is provided in the case of the heretofore known drawing-device mechanism, a spring-pretensioned drawing-device tensioner can readily be used for tensioning the drawing device.

When using the heretofore known drawing-device mechanism wherein the drawing device is subjected to periodic changes in loading, however, for a respective position of the adjustable wheel, the drawing-device tensioner would have to be arrested in a position which is changed as the wheel is adjusted if one seeks to prevent the changes in loading from resulting in vibrations of the drawing device. With each change from one position of the adjustable wheel into another, manipulation of the drawing-device mechanism would thus be necessary.

SUMMARY OF THE INVENTION

It is an object of the invention to provide a drawing-device mechanism for a machine for processing a flat printing material, wherein a gear mechanism of the type mentioned in the introduction hereto is so configured that a change in position of an adjustable wheel is possible without manipulation of the gear mechanism.

With the foregoing and other objects in view, there is provided, in accordance with a first aspect of the invention, a drawing-device mechanism for a machine for processing a flat printing material, comprising an endless drawing device; a first wheel, a second wheel and a drawing-device tensioner in an arrangement wherein the drawing device partially loops around the first and the second wheel; the drawing-device tensioner, with the drawing device partially looped around it, and the drawing device being tautened in the process due to drawing-device pretensioning, being positioned in engagement with the drawing device; the first wheel having a locally fixed rotational axis, and the second wheel, with a changed center-to-center distance between the second wheel and the first wheel, and with maintained elongated sections of the drawing device, being adjustable to different positions within an adjustment range; and a tensioning surface formed on the drawing-device tensioner, the tensioning surface being directed towards the drawing device and being curved convexly in the longitudinal direction of the drawing device; the drawing-device mechanism having a geometry with which, during an adjustment of the second wheel, with an increase in the center-to-center distance in a first case and with a reduction in the center-to-center distance in a second case, the drawing-device pretensioning remains at least approximately unchanged as a result of a reduction in the looping of the drawing device around the drawing-device tensioner in the first case and an increase in the looping of the drawing device around the drawing-device tensioner in the second case, absent any change in location of the drawing-device tensioner.

In accordance with another feature of the invention, the second wheel is pivotable about an axis which is axially-parallel to the second wheel.

In accordance with a further feature of the invention, one of the wheels has a diameter larger than that of the other wheel, and the drawing-device tensioner is spaced farther apart from the wheel with the smaller diameter than from the wheel with the larger diameter.

In accordance with an added feature of the invention, the drawing-device mechanism is constructed as a toothed-belt drive.

In accordance with an additional feature of the invention, the adjustment range is traversible with the center-to-center distance changing in the same direction.

In accordance with yet another feature of the invention, the drawing-device tensioner is constructed as a tensioning roller.

In accordance with a second aspect of the invention, there is provided a machine for processing a flat printing material, having a drawing-device mechanism, comprising an endless drawing device; a first wheel, a second wheel and a drawing-device tensioner in an arrangement wherein the drawing device partially loops around the first and the second wheel; the drawing-device tensioner, with the drawing device partially looped around it, and the drawing device being tautened in the process due to drawing-device pretensioning, being positioned in engagement with the drawing device; the first wheel having a locally fixed rotational axis, and the second wheel, with a changed center-to-center distance between the second wheel and the first wheel, and with maintained elongated sections of the drawing device, being adjustable to different positions within an adjustment range; and a tensioning surface formed on the drawing-device tensioner, the tensioning surface being directed towards the drawing device and being curved convexly in the longitudinal direction of the drawing device; the drawing-device mechanism having a geometry with which, during an adjustment of the second wheel, with an increase in the centerto-center distance in a first case and with a reduction in the center-to-center distance in a second case, the drawing-device pretensioning remains at least approximately unchanged as a result of a reduction in the looping of the drawing device around the drawing-device tensioner in the first case and an increase in the looping of the drawing device around the drawing-device tensioner in the second case, absent any change in location of the drawing-device tensioner.

In accordance with a concomitant feature of the invention, the machine is a sheet-processing rotary printing machine.

Achieving the aforementioned object of the invention thus results from the geometry of the drawing-device mechanism by which, during adjustment of the second wheel, with an increase in the center-to-center distance in a first case and with a reduction in the center-to-center distance in a second case, the drawing-device pretensioning remains unchanged or at least virtually unchanged as a result of a reduction in the wrapping or looping around the drawing-device tensioner in the first case and an increase in the wrapping or looping around the drawing-device tensioner in the second case, without any change in location of the drawing-device tensioner. It is thus possible for the drawing-device tensioner to be arranged in a stationary or locally fixed manner. The aforementioned geometry is determined by calculation, which is discussed hereinafter.

In an exemplary application, the drawing-device mechanism according to the invention serves for driving a shaft which can be adjusted in an axially-parallel manner and, for its part, constitutes a common drive shaft for suction-belt modules by which a suction-belt conveyor is formed, the latter being provided for receiving or accepting sheets which are ejected, in the form of rejects or sample sheets, beyond a stacking or pile station of a delivery of a sheet-processing rotary printing machine, and the suction-belt modules of the suction-belt conveyor forming conveying strands of suction belts which have a negative pressure passing therethrough, the conveying strands forming an abutment surface for the sheets intended for ejection, and it being possible for the position of the abutment surface to be adjusted while maintaining the orientation of the generatrix thereof.

Other features which are considered as characteristic for the invention are set forth in the appended claims.

Although the invention is illustrated and described herein as embodied in a drawing-device mechanism for a machine for processing a flat printing material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings; wherein:

BRIEF DESCRIPTION OF THE DRAWINGS

FIG. 6 is a simplified, enlarged fragmentary diagrammatic view of FIG. 2 showing the drawing-device mechanism.

DESCRIPTION OF THE PREFERRED EMBODIMENTS

Figure 1:
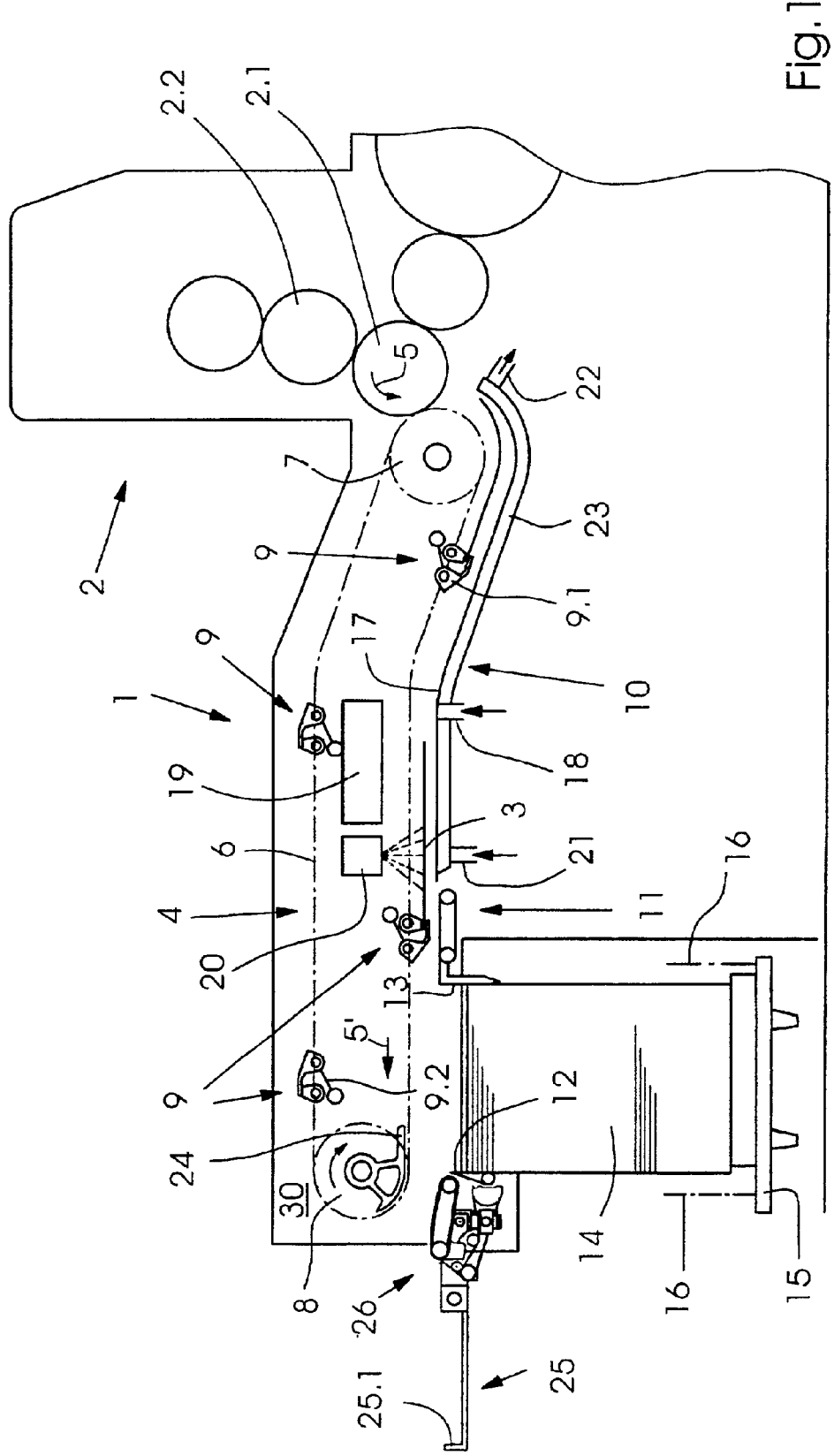
FIG. 1 is a fragmentary diagrammatic side elevational view of a sheet-processing rotary printing machine with a delivery which is equipped for ejecting sheets beyond a stacking or pile station, and wherein the invention of the instant application is incorporated.

Referring now to the drawings and, first, particularly to FIG. 1 thereof, there is shown therein a delivery 1 for selectively forming a sheet pile or stack 14 or for ejecting sheets 3, following a final processing station of the printing machine. Such a processing station may be a printing unit or a post-treatment unit, for example a coating unit. In the illustrated exemplary embodiment, the final processing station is an offset printing unit 2 with an impression cylinder 2.1. The latter guides a respective sheet 3, in a processing direction indicated by the direction-of-rotation arrow 5, through a nip between the impression cylinder 2.1 and a blanket cylinder 2.2, which cooperates with the impression cylinder 2.1, and then transfers the sheet 3 to a chain conveyor 4, non-illustrated grippers which are arranged on the impression cylinder 2.1, and are provided for gripping the sheet 3 at a gripper border at the leading end of the sheet 3, being opened in the process. The chain conveyor 4 comprises two conveying chains 6, of which, respectively, one revolves, during operation, along an inner side of a respective side wall of the delivery 1, the side wall appertaining to a framework of the delivery 1. A respective conveying chain 6 loops or wraps around one of two synchronously driven drive chain wheels or sprockets 7, respectively, of which the axes of rotation are aligned with one another, and is guided, respectively, over a deflecting chain wheel or sprocket 8 which is located downstream from the drive chain or sprocket wheels 7, as viewed in the processing direction. Extending between the two conveying chains 6 are gripper systems 9, borne by the conveying chains, with automatically closing grippers 9.1, which thus, during operation, pass through a continuous gripper path and through gaps between the grippers arranged on the impression cylinder 2.1 and thus receive or accept a respective sheet 3, the aforementioned gripper border at the leading end of the sheet 3 being gripped in the process, immediately before the grippers arranged on the impression cylinder 2.1 are opened, pull or draw the sheet 3 along a transporting path in a transporting direction 5', beyond a sheet-guiding device 10, to a sheet brake 11 and open thereat, in a switching position of a switching element 24, which will be explained hereinafter, so as to transfer the sheet 3 to the sheet brake 11. The latter imparts to the sheets 3 a depositing speed which is slower than the processing speed and releases them once they have reached the depositing speed, with the result that, in a first operating state of the delivery 1, a respective, then decelerated sheet 3 finally comes into contact with leading-edge stops 12 and, being aligned against the latter and against trailing edge stops 13, which are located opposite the leading-edge stops 12, forms, together with preceding and/or following sheets 3, a pile or stack 14, it being possible for the pile 14 to be lowered, by a lifting mechanism, to the same extent as the pile 14 grows in height. Of the lifting mechanism, FIG. 1 shows only a platform 15, which bears the pile 14, and lifting chains 16 bearing the platform 15, the lifting chains 16 being represented in phantom.

On the way between the drive chain or sprocket wheels 7, on the one hand, and the deflecting chain or sprocket wheels 8, on the other hand, the conveying chains 6 are guided by here non-illustrated chain-guide rails, which thus determine the paths of the chain strands and thus the course taken by the gripper path. In the exemplary embodiment of FIG. 1, the sheets 3 are transported by the chain strand shown at the bottom in the figure. That section of the chain path through which the bottom chain strand runs is followed alongside by a sheet-guiding surface 17 which is directed towards the chain path and is formed on the sheet-guiding device 10. A carrying air cushion is preferably formed, during operation, between the sheet-guiding surface 17 and the sheet 3 guided thereover, respectively. For this purpose, the sheet-guiding device 10 is provided with blast or blowing-air nozzles which open out into the sheet-guiding surface 17, only one of the blowing-air nozzles in the form of a stub 18 being shown in FIG. 1 and serving symbolically to represent all thereof.

In order to prevent the printed sheets 3 in the pile 14 from adhering or sticking together, a dryer 19 and a spray powder device 20 are provided on the path of the sheets 3 from the drive chain or sprocket wheels 7 to the sheet brake 11.

In order to avoid excessive heating of the sheet-guiding surface 17 by the dryer 19, a coolant circuit is integrated in the sheet-guiding device 10 and is indicated symbolically in FIG. 1 by an inlet stub 21 and an outlet stub 22 on a coolant tray 23 assigned to the sheet-guiding surface 17.

During operation, the grippers 9.1 of a respective gripper system 9 run through a gripper path determined by the chain paths of the chain strands and, under the action of a spring arrangement, which is not illustrated here, are prestressed into a closed position of the grippers 9.1. In order to open the grippers 9.1, a respective gripper system 9 is provided with a roller-lever arrangement 9.2, which can be actuated by the switching element 24 so that it temporarily opens the normally closed grippers 9.1 when it comes into contact with the switching element 24. In an exemplary configuration, the switching element 24 can be adjusted between an adjustable basic position, in particular, and an extreme position. In a respective adjustable basic position of the switching element 24, the grippers 9.1 open at a first location of the gripper path and thus of the transporting path 28 (note FIG. 2), the first location being determined by the basic position, and each release a respective sheet 3 for forming the pile 14, whereas, in the aforementioned extreme position, the sheets 3 are released at a second location of the gripper path and thus of the transporting path 28, the second location being located downstream from the first location, as viewed in the transporting direction, with the result that, rather than coming into contact with the leading-edge stops 12, the released sheets 3 move beyond the stops and, finally, reach a suitable intercepting device 25 which serves for accommodating sample sheets or rejects.

The published German Patent Document DE 195 19 374 C2 discloses an advantageous configuration of such an intercepting device, which is preferably used here.

Before the sheets released at the second location of the transporting path 28 finally reach the intercepting device 25, they are transferred from the respective grippers 9.1 to a suction-belt conveyor 26. The suction-belt conveyor 26 is represented in a side view in FIG. 2, and in a plan view, and partially cut away, in FIG. 3, and comprises a plurality of conveying modules 26.1, each of which has a suction-belt module 27 having a respective conveying strand 27.1 that departs from a first roller 27.2 and runs onto a second roller 27.3 arranged downstream of the first roller 27.2, as viewed in the transporting direction represented by the arrow 5'. The conveying strands 27.1 form an abutment surface 27.4 which is provided for receiving the sheets 3 released at the aforementioned second location, the abutment surface 27.4 and the transporting path 28 having mutually parallel generatrices.

The grippers 9.1 of a respective gripper system 9, respectively, form a gripper finger 9.1' and a gripper support 9.1", in the direction of which the respective gripper finger 9.1' is prestressed. A sheet 3 transported by the grippers 9.1 is clamped between, on the one hand, the gripper fingers 9.1', and, on the other hand, clamping surfaces of the gripper supports 9.1" which are directed towards the fingers 9.1'. In this respect, a surface area through which the aforementioned clamping surfaces of the gripper supports 9.1" pass while the gripper systems 9 pull a sheet 3 along may be regarded as being the aforementioned transporting path 28. The generatrix of this surface area, i.e., of the transporting path 28, is oriented horizontally in the case of the exemplified delivery, and the generatrix of the aforementioned abutment surface 27.4 is parallel to that of the transporting path 28.

Figure 2:
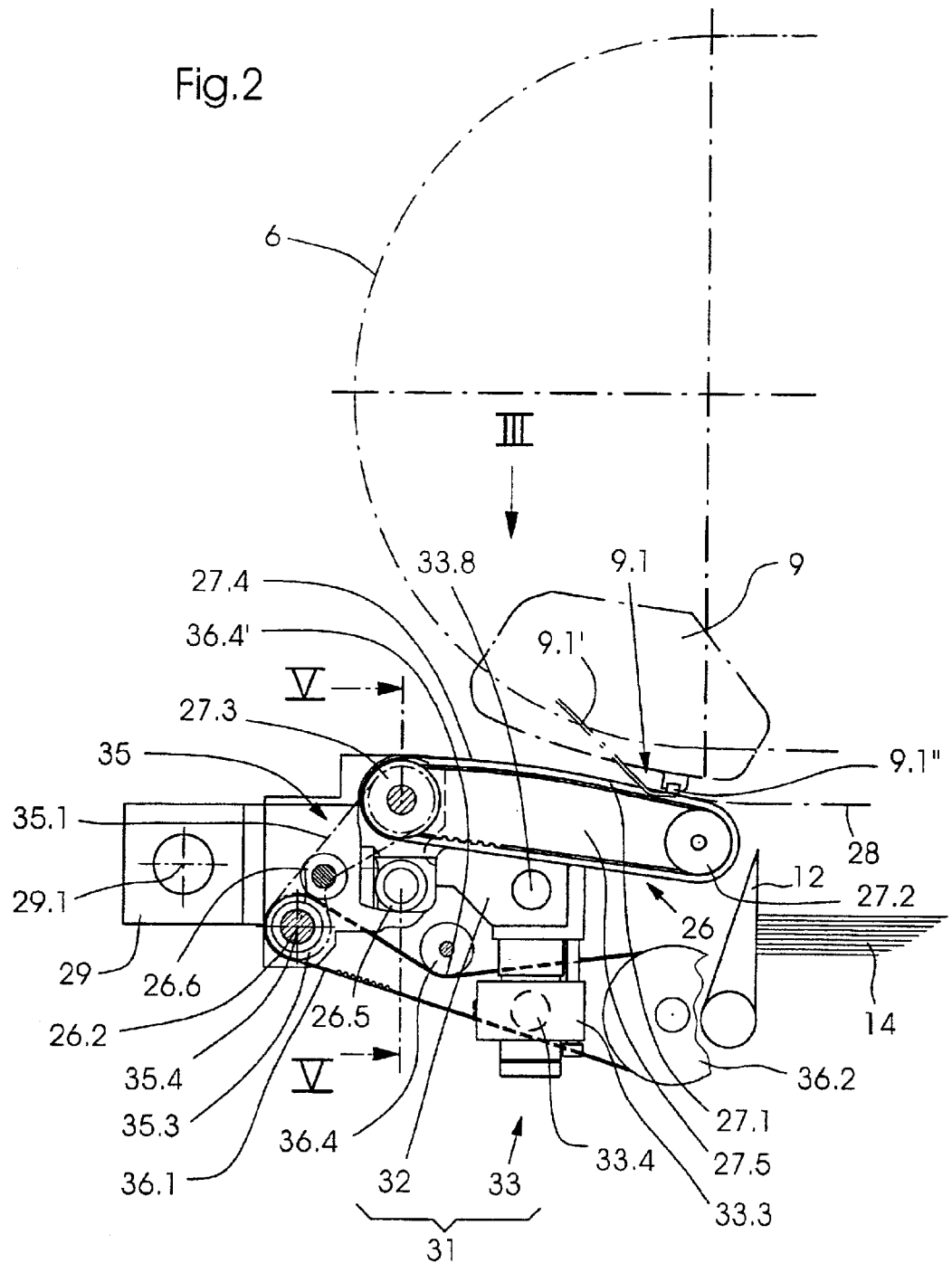
FIG. 2 is an enlarged fragmentary view of FIG. 1 showing an end section of the delivery, with the framework of the rotary printing machine omitted.
Figure 3:
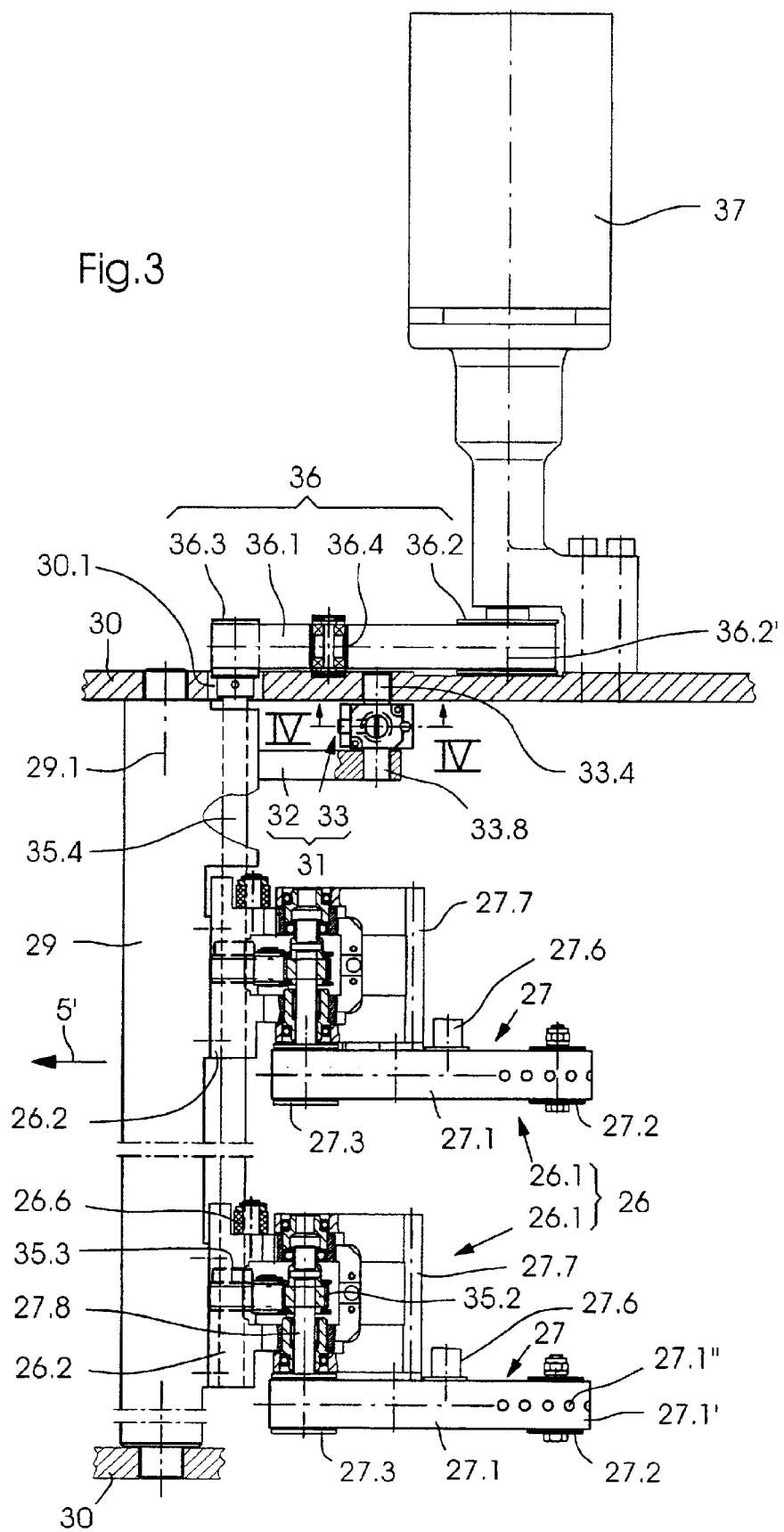
FIG. 3 is a view of FIG. 2, taken partly in section, in the direction of the arrow III, and showing a suction-belt conveyor in accordance with the invention.

A respective conveying strand 27.1 of an endless suction belt 27.1', which is provided with suction openings 27.1" and loops or wraps around the first and second rollers 27.2 and 27.3, passes over a suction box 27.5 shown in FIG. 2 and having non-illustrated suction openings, which are directed towards the conveying strand 27.1 and, as can be seen in FIG. 3, a suction stub 27.6 which can be connected to a non-illustrated negative-pressure generator. The suction box 27.5 is fastened on a carrying frame 27.7. The carrying frame 27.7 has a bearing block 26.2 assigned thereto, which accommodates the carrying frame so that it can be pivoted in relation to the axis of rotation of the second roller 27.3, and in relation to which the carrying frame 27.7, and thus the suction-belt module 27, can be arrested, in a manner which is explained hereinafter, in an operating position of the suction-belt module 27. The bearing block 26.2 is borne by a crossmember 29 extending parallel to the generatrices of the transporting path 28 and/or of the abutment surface 27.4 and, at the respective ends thereof, is accommodated in side walls belonging to a framework 30 of the delivery 1 so that it can be pivoted about a geometrical axis 29.1 which is formed by the crossmember 29 and is parallel to the generatrices of the transporting path 28 and/or of the abutment surface 27.4.

The suction-belt module 27, which, as mentioned hereinbefore, is arrested on the bearing block 26.2 borne, for its part, by the crossmember 29, can be adjusted to pivoting positions to an extent to which it may be adjustable as is explained hereinbelow.

An actuating drive 31 is operatively connected with the crossmember 29, and is constructed for pivoting the latter about the geometrical axis 29.1. The actuating drive 31 comprises a pivoting arm 32, which is connected to the crossmember 29, and a gear mechanism or a transmission 33, which is articulated, on the one hand, on the framework 30 and, on the other hand, on the pivoting arm 32 and, in an exemplary configuration, is constructed as a helical gear or screw mechanism.

Figure 4:
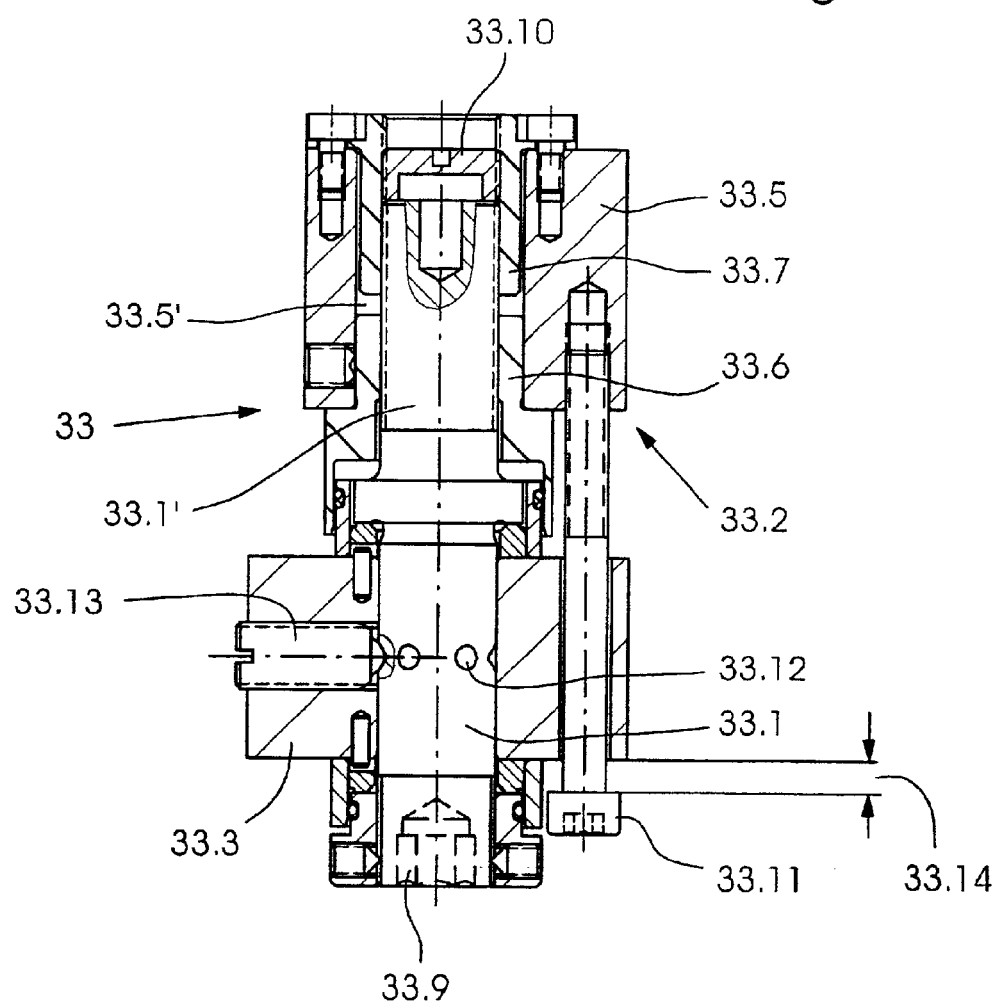
FIG. 4 is an enlarged fragmentary cross-sectional view of FIG. 3 taken along the line IV—IV, in the direction of the arrows.

FIG. 4 illustrates the helical gear or screw mechanism in a sectional view. The mechanism comprises a threaded spindle 33.1 and a spindle-nut arrangement 33.2 cooperating playfree therewith. The threaded spindle 33.1 is accommodated in a rotationally and axially fixed manner in a spindle housing 33.3, which is articulated on the framework 30 via a bolt 33.4, which is provided on the spindle housing and can be seen in FIG. 3 in particular. In the exemplary embodiment of FIG. 4, the spindle-nut arrangement 33.2 is formed by a nut housing 33.5 with a through-passage bore 33.5' which encloses a threaded section 33.1' of the threaded spindle 33.1, with an annular gap remaining in the process. At a respective end of the through-passage bore 33.5', a respective sleeve 33.6, 33.7 is fitted into the through-passage bore 33.5'. The sleeves 33.6 and 33.7, respectively, have an internal thread interacting with the threaded spindle 33.1; they are screwed onto the threaded spindle 33.1, with the simultaneous elimination of play between the respective internal thread of the sleeves 33.6 and 33.7, on the one hand, and the thread of the threaded spindle 33.1, on the other hand, are supported on a respective end side of the nut housing 33.5, the end side having the through-passage bore 33.5' passing therethrough, and, finally, are connected in a rotationally fixed manner to the nut housing 33.5. The nut housing 33.5 is connected articulatedly to the pivoting arm 32 via a bolt 33.8, which can be seen in FIG. 3.

In the simplest case, the actuating drive 31, which is formed as a helical gear or screw mechanism, can be adjusted manually. For this purpose, a hexagon socket 33.9 is machined into a freely accessible end side of the threaded spindle 33.1, with the result that the threaded spindle 33.1 can be rotated by a corresponding wrench, and the spindle-nut arrangement 33.2 can be adjusted axially. The axial adjustment path 33.14 is bounded by stops 33.10 and 33.11, as can be seen in FIG. 4.

The adjustment of the spindle-nut arrangement 33.2, and consequently a change in position of the abutment surface 27.4 in relation to the transporting path 28 (see FIG. 2), is preferably possible by rotating the threaded spindle 33.1 through predetermined angles of rotation, following passage through which the threaded spindle 33.1 assumes a latching position, respectively. For this purpose, the shank of the threaded spindle 33.1, which is accommodated in the spindle housing 33.3, is provided with latching depressions 33.12, which are preferably equally spaced apart on a circumferential line in the circumferential direction of the shank, a pressure-exerting pin 33.13, which is inserted into the spindle housing 33.3, engaging in the latching depressions 33.12. A plurality of latching positions, between which the helical gear or screw mechanism or screw transmission can be adjusted, are thus provided, with the result that the position of the abutment surface 27.4 in relation to the transporting path 28 may be changed by defined amounts. By forming a fine thread on the threaded spindle 33.1 and by arranging a multiplicity of latching depressions 33.12 on the shank of the threaded spindle 33.1, precise adjustment of the abutment surface 27.4 to given operating positions may be achieved.

In the possible event of a disruption wherein a sheet 3 released by one of the gripper systems 9 at the aforementioned second location is not correctly received by the conveying strands 27.1 and transported farther in the direction towards the intercepting device 25, the sheet 3 bridges over the leading-edge stops 12, with the result that following sheets 3, regardless of the location of the release thereof by the gripper systems 9, push themselves onto the incorrectly further transported sheet 3 and cause a jam, which may result in damage.

Allowances are made for such an occurrence, in turn, by a capability of changing the spatial position of the abutment surface 27.4, while maintaining the orientation of the generatrix thereof. For this purpose, as has already been indicated and will be explained in greater detail hereinbelow, a respective suction-belt module 27 is arranged so that it can be pivoted, and arrested in an operating position, and, in the exemplary configuration, is accommodated so that it can be pivoted, and arrested in relation to the hereinaforementioned bearing block 26.2, which is borne by the crossmember 29.

As is apparent from FIG. 3, the bearing block 26.2 rotatably accommodates, on the one hand, a drive shaft 27.8, which is connected in a rotationally fixed manner to the second roller 27.3 of the suction-belt module 27, and, on the other hand, the carrying frame 27.7 by a mounting which is concentric with the drive shaft 27.8, the carrying frame 27.7, as has already been explained, bearing the suction box 27.5, which has the suction belt 27.1' passing thereover and, in addition, rotatably accommodates the first roller 27.2, which has the suction belt 27.1' wrapped or looped around it.

Figure 5:
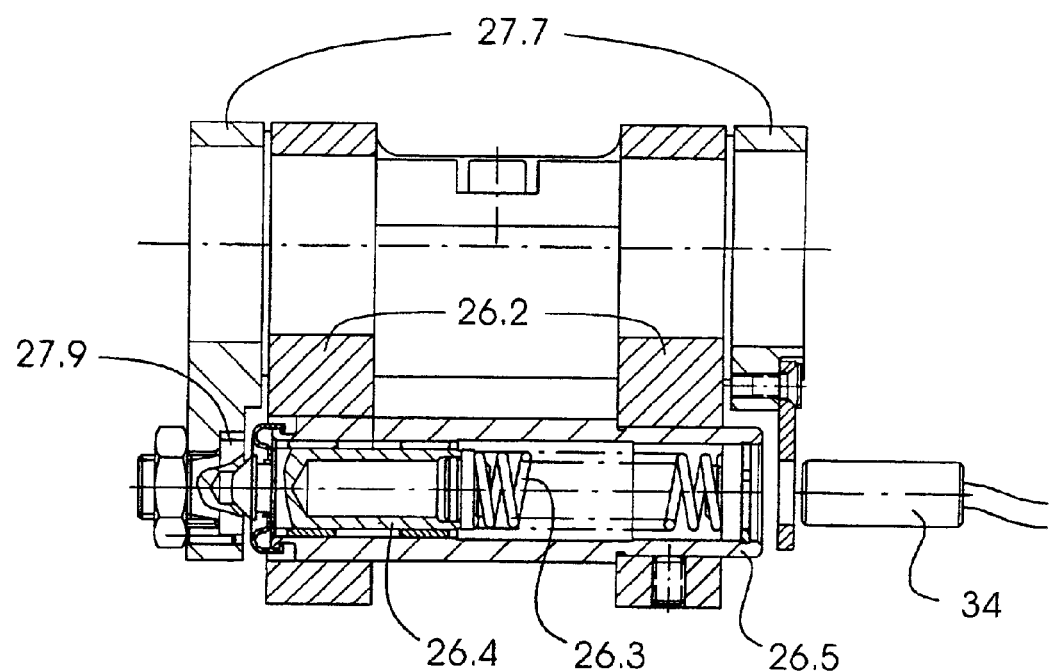
FIG. 5 is an enlarged fragmentary cross-sectional view of FIG. 2 taken along the line V—V, in the direction of the arrows.

With such a connection of the carrying frame 27.7 to the bearing block 26.2, the carrying frame 27.7 is basically pivotable in relation to the latter. However, in non-disrupted operation of the suction-belt conveyor 26, pivoting is prevented by an arresting action. This is accomplished as shown in FIG. 5, which illustrates a sectional view taken along the line V—V in FIG. 2, but which does not represent all details in full. The components provided for arresting purposes comprise a latching bolt 26.4 which is prestressed by a spring 26.3 and is accommodated, in an axially-parallel manner in relation to the drive shaft 27.8 (note FIG. 3), in a sleeve 26.5, closed on one side and inserted into the bearing block 26.2, and having a latching head which projects out of the open end of the sleeve 26.5 and, in an operating position of the suction-belt conveyor 26 and/or of the suction-belt module 27, is latched into a latching socket 27.9 inserted into the carrying frame 27.7.

The engagement of the latching bolt 26.4, retained by the spring 26.3, into the latching socket 27.9 keeps the suction-belt module 27 in an operating position during non-disrupted operation of the suction-belt conveyor. In the case of the aforementioned jam, a plurality of sheets 3 released at the second location accumulate between the abutment surface 27.4 and a respective gripper system 9 passing the latter, with the result that, finally, one of the gripper systems 9, via the accumulated sheets 3, subjects the conveying strands 27.1 to a transverse force which is sufficient for eliminating the latching action achieved by the spring 26.3. In the case of the mutual assignment of the abutment surface 27.4 to the transporting path 28, which can be seen in FIG. 2, and of the capability of the suction-belt module 27 to pivot about the axis of rotation of the second roller 27.3, which is located downstream of the first roller 27.2, as seen in the transporting direction 5', the aforementioned transverse force, which finally acts upon the suction box 27.5 and thus on the carrying frame 27.7, causes the suction-belt module 27 to pivot downwardly, about the axis of rotation of the second roller 27.3, into a position wherein it is moved away from the operating position, and, in relation to the path over which the gripper systems run in the region of the suction-belt module 27, and which moves away from the abutment surface 27.4 along the latter, this produces a clearance for the sheets which have built up, as a result of which damage to the components involved in the process of ejecting the sheets 3 released at the second location may then be prevented, in particular, by a signal which can be generated by the pivoting of the suction-belt module 27 and can be utilized in order to suppress a processing of any further sheets 3.

In order to generate a corresponding signal, a sensor 34, which is shown in FIG. 5, is provided by way of example, and the arrangement is such that this sensor 34 emits the aforementioned signal in a position of the suction-belt module 27 wherein the latter has been moved out of the operating position thereof, i.e., pivoted downwardly, in this case.

In the downwardly pivoting position of the suction-belt module 27, in the example at hand, an extension of the carrying frame 27.7 which accommodates the latching socket 27.9 is supported on a stop 26.6 provided on the bearing block 26.2.

In the exemplary embodiment at hand, the revolving of the suction belt 27.1', this revolving action being implied in the term suction-belt conveyor and merely being assumed in the foregoing explanations, so that the conveying strand 27.1 thereof transports farther a sheet 3 arriving in the processing direction according to the arrow 5' in FIG. 1, and received by the suction-belt conveyor 26, albeit at an ultimately lower speed than that of the gripper systems 9, is realized by a belt drive 35 which is accommodated in the bearing block 26.2 and, although the belt 35.1 thereof is in the tensioned state, the belt drive 35 is indicated in FIG. 2 without a belt tensioner. A driven wheel 35.2 of the belt drive 35 is connected in a rotationally fixed manner to the drive shaft 27.8 of the suction-belt module 27 (note FIG. 3), while a drive wheel 35.3 is connected in a rotationally fixed manner to a shaft 35.4, which is only indicated, in cross section, in FIG. 2 and is driven and mounted in a manner which is not illustrated in any greater detail. Such an arrangement is provided for each conveying module 26.1, the shaft 35.4 being common to the conveying module. In the simplest case, the shaft 35.4 rotates uniformly and provides the respective conveying strand 27.1 with a revolving speed which is lower than the speed of the gripper systems 9 and, due to which, the sheets 3 attached by suction to the abutment surface 27.4 under the action of the aforementioned negative-pressure generator are finally braked to an ejecting speed, at which the sheets 3 finally come into contact with stops 25.1 which are provided at a downstream end of the intercepting device 25, as viewed in the processing direction.

The shaft 35.4 is mounted in the crossmember, at the end of the latter which is directed towards the gear mechanism 33, engages through each of the bearing blocks 26.2 and, in the latter, is connected in a rotationally fixed manner, respectively, to each of the hereinaforementioned drive wheels 35.3 for the suction-belt modules 27 (note FIG. 3). To this extent, during adjustments of the operating positions of the suction-belt modules 27 arrested in a releasable manner in relation to the respective bearing block 26.2, the shaft 35.4 is pivoted in an axially-parallel manner about the geometrical axis 29.1 formed by the crossmember 29.

As can be seen in FIGS. 2 and 3 in particular, the shaft 35.4 is driven via a drawing-device mechanism 36. The latter comprises an endless drawing device 36.1, in this case, formed as a toothed belt, a first wheel 36.2 with a stationary rotational axis 36.2', a second wheel 36.3, which is connected in a rotationally fixed manner to the shaft 35.4, and a drawing-device tensioner 36.4, in this case, formed as a tensioning roller, in an arrangement wherein the drawing device 36.1 partially wraps or loops around the first wheel 36.2 and the second wheel 36.3, and the drawing-device tensioner 36.4, having the drawing device 36.1 partially wrapped or looped around it and tautening the drawing device in the process by drawing-device pretensioning, is positioned against or engaged with the drawing device 36.1. Drawing-device pretensioning here is understood to be tensioning which prevails in the drawing device 36.1 at rest and is pre-set by the drawing-device tensioner 36.4.

In this example, the second wheel 36.3, with the changing of the center-to-center distance between it and the first wheel 36.2 and with the maintenance of the straightened sections of the drawing device, can be adjusted to different positions within an adjustment range as a result of pivoting the crossmember 29 about the geometrical axis 29.1. The adjustment range here corresponds with the hereinbefore explained axial adjustment path 33.14 of the spindle-nut arrangement 33.2, this path already having been discussed in conjunction with FIG. 4. In this exemplary application, the drawing-device tensioner 36.4 is constructed as a tensioning roller and thus has a tensioning surface 36.4' which is directed towards the drawing device 36.1 and is curved convexly in the longitudinal direction of the latter.

The drawing-device mechanism 36, and thus in this exemplary application, the suction belts 27.1' are driven via a motor 37 which is fastened on the framework 30, in this case is arranged on the outer side of a side wall belonging to the framework 30, and has a motor shaft which is connected in a rotationally fixed manner to the first wheel 36.2. To this extent, the drawing-device tensioner 36.4 and the second wheel 36.3, which is connected in a rotationally fixed manner to the shaft 35.4, which is common to the suction-belt modules 27, are also arranged on the outer side of the aforementioned side wall, wherein there is provided a cut-out 30.1 through which the end of the shaft 35.4 passes and which creates a necessary clearance for the aforementioned axially-parallel pivoting of the shaft 35.4 in relation to the geometrical axis 29.1.

The drawing-device tensioner 36.4 is arranged in the stationary state, in a manner which is not illustrated in any greater detail, on the aforementioned side wall, and is disposed thereat so that, during adjustment of the second wheel 36.3, with an increase in the center-to-center distance A in a first case and a reduction in the center-to-center distance in a second case, the drawing-device pretensioning set by the drawing-device tensioner remains at least approximately unchanged as a result of a reduction in the wrap or loop around the drawing-device tensioner 36.4 in the first case and an increase in the wrap or loop around the drawing-device tensioner 36.4 in the second case, i.e. it fluctuates at most within a given tolerance range.

In the application at hand, the assumed fixed construction features are as follows: the position of the geometrical axis 29.1, the distance of the second wheel 36.3 from the geometrical axis 29.1, the position and the magnitude of the sector S (note FIG. 6), which constitutes the adjustment range of the second wheel 36.3, the position of the first wheel 36.2 and the effective diameter of the first and second wheels 36.2 and 36.3. The position and the magnitude of the sector S are predetermined or prescribed here so that the second wheel 36.3 passes therethrough in a respective direction with the center-to-center distance A changing in the same direction.

Taking this as a base, the specified placement of the drawing-device tensioner 36.4, which is provided as a tensioning roller, is achieved by initially selecting a diameter for the tensioning roller and selecting a commercially available length of a corresponding drawing device, in this case of a toothed belt, the tensioning roller being arranged, in principle, so that the drawing device 36.1 wraps or loops around it to a reduced extent when the center-to-center distance A increases during adjustment of the second wheel 36.3 and the wrap or loop around the tensioning roller increases when the center-to-center distance A decreases during adjustment of the second wheel 36.3.

Based upon the resulting geometry, which is indicated in FIG. 6, repeated calculations then determine the co-ordinates of the tensioning roller, in particular in relation to the axis of rotation of the first wheel 36.2, so that the theoretical change in length of the drawing device 36.1 assumes a minimum. If the minimum achieved with the selected length for the drawing device 36.1 and the selected diameter for the tensioning roller is not sufficiently small, these magnitudes are varied for new calculations. The tolerance for the length of the tensioning device 36.1 must be taken into account in the aforementioned calculations.

It is particularly beneficial for achieving the aforementioned minimum, if one of the two wheels 36.2 and 36.3, in this configuration of the first wheel 36.2, has a larger diameter than the other, and the drawing-device tensioner 36.4 is spaced apart farther from the wheel with the smaller diameter than from the wheel with the larger diameter.

I claim:

1. A drawing-device mechanism for a machine for processing a flat printing material, comprising:

a first wheel having a locally fixed rotational axis;

a second wheel having a rotational axis being pivotable about a further axis being axially parallel to said rotational axis of said second wheel, said second wheel being adjustable to different positions within an adjustment range for changing a center-to-center distance between said first wheel an said second wheel;

a drawing-device tensioner being disposed at a fixed location and including a tensioning surface;

an endless drawing device having a longitudinal direction and being partially looped around said first wheel, said second wheel and said drawing-device tensioner, said endless drawing device being positioned in engagement with said drawing-device tensioner and being tautened by drawing device pretensioning;

said tensioning surface being directed towards said drawing device and being curved convexly in said longitudinal direction of said endless drawing device, and said first and second wheels and said tensioning device defining a geometry for maintaining said drawing-device pretensioning at least approximately unchanged in a first case increasing the center-to-center distance resulting in a reduction of the partially looping of said endless drawing device around said drawing-device tensioner and in a second case reducing the center-to-center distance resulting in an increase of the partially looping of said endless drawing device around said drawing-device tensioner.

2. The drawing-device mechanism according to claim 1, wherein one of said wheels has a diameter larger than that of the other wheel, and said drawing-device tensioner is spaced farther apart from the wheel with the smaller diameter than from the wheel with said larger diameter.

3. The drawing-device mechanism according to claim 1, wherein the drawing-device mechanism is constructed as a toothed-belt drive.

4. The drawing-device mechanism according to claim 1, wherein said adjustment range is traversible with said center-to-center distance changing in the same direction.

5. The drawing-device mechanism according to claim 1, wherein said drawing-device tensioner is constructed as a tensioning roller.

6. A machine for processing a flat printing material, having a drawing-device mechanism, comprising:

a first wheel having a locally fixed rotational axis;

a second wheel having a rotational axis being pivotable about a further axis being axially parallel to said rotational axis of said second wheel, said second wheel being adjustable to different positions within an adjustment range, for changing a center-to-center distance between said first wheel and said second wheel;

a drawing-device tensioner being disposed at a fixed location and including a tensioning surface; an endless drawing device having a longitudinal direction and being partially looped around said first wheel, said second wheel and said drawing-device tensioner, said endless drawing device being positioned in engagement with said drawing-device tensioner and being tautened by drawing device pretensioning;

said tensioning surface being directed towards said drawing device and being curved convexly in said longitudinal direction of said endless drawing device; and said first and second wheels and said tensioning device defining a geometry for maintaining said drawing-device pretensioning at least approximately unchanged in a first case increasing the center-to-center distance resulting in a reduction of the partially looping of said endless drawing device around said drawing-device tensioner and in a second case reducing the center-to-center distance resulting in an increase of the partially looping of said endless drawing device around said drawing-device tensioner.

7. A machine according to claim 6, wherein the machine is a sheet-processing rotary printing machine.

* * * * *